US010759904B2

(12) United States Patent
Thongyai et al.

(10) Patent No.: US 10,759,904 B2
(45) Date of Patent: Sep. 1, 2020

(54) METHOD FOR PREPARING POLY(CARBONATE-ETHERIMIDE) COMPOUND (71) Applicant: PTT Global Chemical Public Company Limited, Bangkok (TH)

(72) Inventors: Supakanok Thongyai, Bangkok (TH); Papapida Pornsuriyasak, Bangkok (TH); Suchada Tang-Amornsuksan, Bangkok (TH); Sarawut Lunvongsa, Bangkok (TH); Montira Uprijit, Nakhon Pathom (TH); Siriwanna Ounkaew, Lop Buri (TH)

(73) Assignee: PTT GLOBAL CHEMICAL PUBLIC COMPANY LIMITED, Bangkok (TH)

( * ) Notice: Subject to any disclaimer, the term of this patent is extended or adjusted under 35 U.S.C. 154(b) by 6 days.

(21) Appl. No.: 16/068,957

(22) PCT Filed: Nov. 14, 2016

(86) PCT No.: PCT/TH2016/000093
§ 371 (c)(1),
(2) Date: Jul. 10, 2018

(87) PCT Pub. No.: WO2017/127031
PCT Pub. Date: Jul. 27, 2017

(65) Prior Publication Data
US 2019/0202980 A1 Jul. 4, 2019

(30) Foreign Application Priority Data
Jan. 18, 2016 (TH) .............................. 1601000239

(51) Int. Cl.
*C08G 64/18* (2006.01)
*C08G 64/12* (2006.01)
*C08G 73/10* (2006.01)
*C08K 3/16* (2006.01)
*C08K 3/26* (2006.01)
*C08K 5/3432* (2006.01)

(52) U.S. Cl.
CPC ............. *C08G 64/18* (2013.01); *C08G 64/12* (2013.01); *C08G 64/183* (2013.01); *C08G 73/10* (2013.01); *C08G 73/1021* (2013.01); *C08G 73/1046* (2013.01); *C08G 73/1053* (2013.01); *C08G 73/1071* (2013.01); *C08K 3/16* (2013.01); *C08K 3/26* (2013.01); *C08K 5/3432* (2013.01)

(58) Field of Classification Search
None
See application file for complete search history.

(56) References Cited

U.S. PATENT DOCUMENTS

| 4,657,977 A | 4/1987 | Peters |
| 4,870,155 A | 9/1989 | Matzner et al. |
| 5,077,350 A * | 12/1991 | Mullins .................. C08G 81/00 525/394 |
| 5,332,784 A | 7/1994 | Shiraki et al. |
| 5,852,085 A | 12/1998 | Brown et al. |
| 6,080,833 A | 6/2000 | Otsuji et al. |
| 2005/0070684 A1 | 3/2005 | Gallucci et al. |

FOREIGN PATENT DOCUMENTS

| EP | 0257469 A1 | 3/1988 |
| EP | 0353478 A1 | 2/1990 |
| JP | S63113023 A | 5/1988 |

(Continued)

OTHER PUBLICATIONS

International Search Report and Written Opinion from PCT/TH2016/000093 dated Feb. 6, 2018.

(Continued)

*Primary Examiner* — David J Buttner
(74) *Attorney, Agent, or Firm* — Warner Norcross + Judd LLP (57) ABSTRACT The present invention relates to a method for preparing poly(carbonate-etherimide) compound comprising polycarbonate segment as shown in the structure (A) and polyetherimide segment as shown in the structure (B). Said method does not contain a highly toxic phosgene in its operation, can be performed easily, and can be operated at not high temperature. wherein $R_1$ represents aromatic with 6 to 30 carbon atoms or, optionally said aromatic is bonded with heteroatom; $R_2$ represents aromatic with 6 to 30 carbon atoms or, optionally said aromatic is bonded with heteroatom; m is an integer from 1 to 15; and n is an integer from 1 to 10.

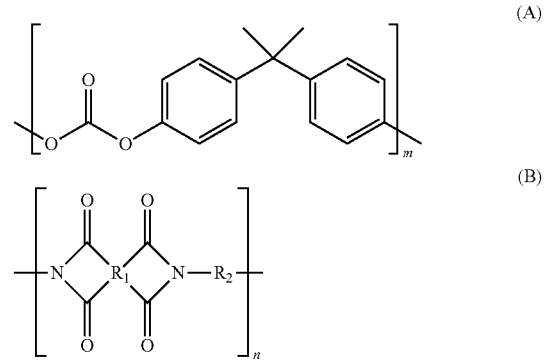

22 Claims, 2 Drawing Sheets (56) References Cited

FOREIGN PATENT DOCUMENTS

| JP | H0977870 A | 3/1997 |
|---|---|---|
| JP | H10273591 A | 10/1998 |
| JP | 2007516311 A | 6/2007 |

OTHER PUBLICATIONS

Supplementary European Search Report for EP Appl. No. 16886683.8, dated Aug. 21, 2019, 3 pages.
Machine assisted English translation of Office Action and Search Report for JP Appl. No. 2018-537538 obtained from Global Dossier dated Apr. 23, 2020, 19 pages.
Machine assisted English translation of JPH9077870A obtained from https://patents.google.com/patent dated May 5, 2020, 10 pages.

* cited by examiner

METHOD FOR PREPARING POLY(CARBONATE-ETHERIMIDE) COMPOUND

TECHNICAL FIELD

The present invention relates to a method for preparing poly(carbonate-etherimide) compound.

BACKGROUND ART

At present, polycarbonate is one of thermoplastics that have been widely used in many industries such as vehicle industry, appliance industry, and electronic industry because of their unique characteristics such as transparency, strength, and impact resistance. However, polycarbonate has some disadvantages which limit its application, including chemical resistance and low heat resistance. Therefore, there have been attempts to improve the polycarbonate properties in order to overcome said problems by mixing and/or synthesizing polycarbonate with other polymers that can tolerate high heat and chemicals such as polyetherimide.

U.S. Pat. No. 4,548,997 disclosed polymer blends between polycarbonate and polyetherimide. Said polymer showed better heat resistance comparing to polycarbonate. However, it was found that the polymer blends according to said patent gave lower impact resistance which might be resulted from the incompatibility of polycarbonate and polyetherimide. This could be seen from the two glass transition temperatures of said polymer blends, in which one belonged to polycarbonate and the other belonged to polyetherimide. The compatibility of both polymers is a limitation for the development of heat and mechanical properties.

U.S. Pat. No. 4,393,190 disclosed the preparation method of poly(carbonate-etherimide) from diimide having hydroxyl terminal group by the reaction with polyhydric phenol and phosgene. The obtained copolymer according to said patent had the glass transition temperature close to polycarbonate. This can be presumed that the hydroxyl terminal group of diimide had lower reactivity comparing to polyhydric phenol, leading to the obstacle of diimide in its reaction. Thus, the obtained copolymer yielded the low etherimide content in its structure, showing the limitation of said reaction. However, said patent did not disclose the heat or mechanical properties of the obtained polymer. Moreover, the use of phosgene as a reactant is a concerned issue due to its high toxicity, especially to the respiratory system.

U.S. Pat. No. 4,611,048 disclosed the preparation of short chain polyetherimide having hydroxyl terminal group. The said polyetherimide could be reacted with polyhydric phenol and phosgene to give poly(carbonate-etherimide) block copolymer by the interfacial polymerization disclosed in U.S. Pat. No. 4,657,977. Said method gave the copolymer with a random block. This would limit its use and be difficult to control the block distribution. Moreover, the use of phosgene the use of phosgene as a reactant is a concerned issue due to its high toxicity, especially to the respiratory system.

U.S. Pat. No. 4,757,150 disclosed the preparation method of poly(carbonate-etherimide). The said method comprised the preparation of bischloroformate from the reaction of polyetherimide bisphenol and phosgene. Then, said bischloroformate was further reacted in order to prepare cyclic heterocarbonate and poly(carbonate-etherimide) respectively. However, said method still used phosgene as its precursor of carbonate. Moreover, the copolymer prepared by the method according to said patent had 2 glass transition temperatures which were 148° C. and 210° C., indicating the separation of polycarbonate and polyetherimide into 2 phases.

U.S. Pat. No. 6,096,853 disclosed the preparation of poly(carbonate-etherimide) having higher heat resistance comparing to normal polycarbonate. The said method comprised the preparation of diimide having hydroxyl terminal group from the reaction of dianhydride and aminophenol. Then, said diimide was reacted with phosgene or other carbonate precursors by melt polymerization or interfacial polymerization to obtain poly(carbonate-etherimide), in which the glass transition temperature was in a range from about 160 to 175° C. However, said melt polymerization has to be performed at the high temperature, which caused high energy consumption and might be problematic in an industrial scale production.

Until present, there have been many attempts to develop other carbonate compounds for preparing poly(carbonate-etherimide) through melt polymerization to avoid the use of phosgene which is highly toxic. For example, U.S. Pat. No. 7,230,066 disclosed the preparation of carbonate-etherimide block copolymer using bis-methyl salicyl carbonate as a precursor of carbonate and reacted with polyhydric phenol and polyetherimide having hydroxyl terminal group via melt polymerization at a high temperature in a range of from 230 to 300° C. Due to melt polymerization, the reaction was performed at a high temperature, resulting in high energy consumption. Moreover, bis-methyl salicyl carbonate is an expensive chemical comparing to other carbonate precursors.

U.S. Pat. No. 4,713,439 disclosed the preparation of poly(carbonate-etherimide) without the use of phosgene. Diaminodiphenyl carbonate was used as a carbonate precursor and was reacted with dianiline via cyclization reaction at a temperature about 300° C. This leads to high energy consumption and might be problematic in an industrial scale production.

U.S. Pat. No. 5,756,643 disclosed the preparation of polyimide copolymer comprising a hard segment of polyimide and a soft segment of aliphatic polycarbonate or a mixture of aliphatic polycarbonate and aliphatic polyester. Said method was consisted of the mixing of dianhydride and aliphatic polycarbonate diol to form an ester bond and yield an oligomer having anhydride terminal group. Then, the obtained oligomer was reacted with diamine at high temperature in a range of from about 220 to 300° C. to obtain a polyimide copolymer. The obtained copolymer possessed imide, carbonate, ester, and carboxylic groups in the structure. The ester functional group in the structure might reduce the heat and chemical resistance in the copolymer.

From the reasons mentioned above, this invention aims to develop new method to prepare poly(carbonate-etherimide) in which said method does not contain a highly toxic phosgene, can be performed easily, and can be operated at not high temperature, in which the obtained poly(carbonate-etherimide) has suitable properties and structure for further applications that require strength and high heat resistance especially as the compatibilizer for polymer blend of polycarbonate and polyetherimide to improve its compatibility.

SUMMARY OF INVENTION

The present invention relates to the method for preparing poly(carbonate-etherimide) compound comprising polycarbonate segment as shown in structure (A) and polyetherimide segment as shown in structure (B), comprising the following steps:

(a) adding aromatic amine having halogen functional group into a solution containing aromatic dianhydride and aromatic diamine;

(b) mixing a polycarbonate with bisphenol A; and (c) adding mixture containing copper compound and pyridyl ketone compound into a mixture containing basic cesium compound and the mixture obtained from the step (a) and (b);

wherein $R_1$ represents aromatic with 6 to 30 carbon atoms or, optionally said aromatic is bonded with heteroatom;

$R_2$ represents aromatic with 6 to 30 carbon atoms or, optionally said aromatic is bonded with heteroatom;

m is an integer number from 1 to 15; and n is an integer number from 1 to 10.

In another embodiment, this invention relates to the method for preparing poly(carbonate-etherimide) compound having graft copolymer structure as shown in the structure (II), comprising the following steps:

(a) adding aromatic amine having halogen functional group and aromatic diamine into aromatic dianhydride;

(b) mixing polycarbonate and bisphenol A; and (c) adding mixture containing copper compound and pyridyl ketone compound into a mixture containing basic cesium compound and the mixture obtained from the step (a) and (b);

wherein (A) represents structure (B) represents structure $R_1$ represents aromatic with 6 to 30 carbon atoms or, optionally said aromatic is bonded with heteroatom;

$R_2$ represents aromatic with 6 to 30 carbon atoms or, optionally said aromatic is bonded with heteroatom;

$R_3$ represents aromatic with 6 to 30 carbon atoms;

m is an integer number from 1 to 15;

n is an integer number from 1 to 10;

y is an integer number from 1 to 4.

DETAILED DESCRIPTION OF THE INVENTION

The present invention relates to the method for preparing poly(carbonate-etherimide) compound which will be described by the following description.

Definition

Technical terms or scientific terms used herein have definitions as understood by those having an ordinary skilled in the art, unless stated otherwise Any tools, equipment, methods, or chemicals mentioned here mean tools, equipment, methods, or chemicals commonly operated or used by those skilled in the art, unless explicated stated otherwise that they are tools, equipment, methods, or chemicals specific used in this invention.

Use of singular noun or singular pronoun with "comprising" in the claims or the specification refers to "one" and also "one or more", "at least one", and "one or more than one".

Throughout this application, the term "about" is used to indicate that any value presented or showed herein may potentially vary or deviate. Such variation or deviation may result from errors of equipment, method, or from individual operator implementing equipment or method.

Any methods, processes, or steps being operated in this invention, unless stated otherwise, are under an inert atmosphere.

One objective of this invention is the method for preparing poly(carbonate-etherimide) compound comprising polyetherimide segment and polycarbonate segment, wherein said method does not contain a highly toxic phosgene, can be performed easily, and can be operated at not high temperature.

Another objective of this invention is poly(carbonate-etherimide) compound comprising polyetherimide segment and polycarbonate segment that can be used as a compatibilizer of polymer blend of polycarbonate and polyetherimide in order to improve its compatibility, avoid phase separation, and result in its better thermal properties, comparing to the polymer blend without poly(carbonate-etherimide) as the compatibilizer.

Hereafter, the detailed description is shown without any purpose to limit any scope of the invention.

This invention relates to the method for preparing poly (carbonate-etherimide) compound comprising polycarbonate segment as shown in the structure (A) and polyetherimide segment as shown in the structure (B), comprising:

(a) adding aromatic amine having halogen functional group into a solution containing aromatic dianhydride and aromatic diamine;

(b) mixing polycarbonate with bisphenol A; and (c) adding a mixture containing copper compound and pyridyl ketone compound into a mixture containing basic cesium compound and the mixture obtained from the step (a) and (b);

wherein
$R_1$ represents aromatic with 6 to 30 carbon atoms or, optionally said aromatic is bonded with heteroatom;
$R_2$ represents aromatic with 6 to 30 carbon atoms or, optionally said aromatic is bonded with heteroatom;
m is an integer number from 1 to 15; and
n is an integer number from 1 to 10.

In one embodiment, in order to obtain poly(carbonate-etherimide) compound having block copolymer structure as shown in the structure (I), aromatic amine having halogen functional group in step (a) may be selected from 4-chloroaniline2-nitro-4-chloroaniline, 2,5-dinitro-4-chloroaniline, 2-phenyl-4-chloroaniline, 2-methoxy-4-chloroaniline, 6-Chloro-2-naphthylamine, 6-chloro-4-methoxy-2-naphthalenamine, 4'-chloro-[1,1'-biphenyl]-4-amine, 4'-chloro-3-methyl-[1,1'-biphenyl]-4-amine, 4'-chloro-2'-methyl-[1,1'-biphenyl]-4-amine, 4'-chloro-2-methyl-[1,1'-biphenyl]-4-amine, 4'-chloro-3-ethyl-[1,1'-biphenyl]-4-amine, 4'-chloro-2',5'-dimethyl-[1,1'-biphenyl]-4-amine, 4'-chloro-3,5-diethyl-[1,1'-biphenyl]-4-amine, 4'-chloro-3'-methoxy-[1,1'-biphenyl]-4-amine, 4'-chloro-2-methoxy-[1,1'-biphenyl]-4-amine, 4-chlorophenoxy)-aniline, 4-(4-chlorophenoxy)-2-methyl-benzenamine, 4-(4-chloro-3-methylphenoxy)-benzenamine, 4-(4-chloro-2-methylphenoxy)-benzenamine, 4-(4-chlorophenoxy)-3-methyl-benzenamine, 4-(4-chloro-3-methoxyphenoxy)-benzenamine, 4-(4-chloro-3-methylphenoxy)-2-methyl-benzenamine, 4-(4-chlorophenoxy)-2-methoxy-benzenamine, 4-[(4-chlorophenyl)thio]-benzenamine, 4-[(4-chlorophenyl)sulfinyl]-benzenamine, 4-[(4-chlorophenyl)thio]-2-methyl-benzenamine, 4-[(4-chlorophenyl)thio]-2-methoxy-benzenamine, 2-amino-5-[(4-chlorophenyl)thio]-benzonitrile, $N^1$-(4-chlorophenyl)-1,4-benzenediamine, $N^4$-(4-chlorophenyl)-2-methyl-1,4-benzenediamine, 4-[(4-chlorophenyl) methyl]-benzenamine, 4-[(4-chlorophenyl)methyl]-2-methyl-benzenamine, and 4-aminophenyl)(4-chlorophenyl)-methanone.

Preferably, aromatic amine having halogen functional group is selected from 4-chloroaniline, 2-nitro-4-chloroaniline, 2,5-dinitro-4-chloroaniline, 2-phenyl-4-chloroaniline, 2-methoxy-4-chloroaniline, 4'-chloro-[1,1'-biphenyl]-4-amine, 4-(4-chlorophenoxy)-aniline, 4-[(4-chlorophenyl)thio]-benzenamine or a mixture thereof and the most preferably is 4-chloroaniline;

$$(A)-O-R_3-(B) \hspace{2cm} (I)$$

wherein $R_3$ represents aromatic with 6 to 30 carbon atoms.

In one embodiment, in order to obtain poly(carbonate-etherimide) compound having graft copolymer structure as shown in the structure (II), aromatic amine having halogen functional group in step (a) may be selected from 4,4' methylenebis(2-chloroaniline), 3,3'-dichlorobenzidine, 2, 2', 5, 5' tetrachlorobenzidine, 4,4'-(1-methylethylidene)bis[2-chloro-benzenamine], 4,4'-oxybis[2-chloro-benzenamine, bis(4-amino-3-chlorophenyl)-methanone, 4,4'-thiobis[2-chloro-benzenamine], 4,4'-sulfonylbis[2-chloro-benzenamine], 4,4'-sulfonylbis[2,6-dichloro-benzenamine], or mixture thereof, preferably is 4,4' methylenebis(2-chloroaniline), 2, 2', 5, 5' tetrachlorobenzidine, or a mixture thereof, wherein
$R_3$ represents aromatic with 6 to 30 carbon atoms; and
y is an integer number from 1 to 4.

In one embodiment, poly(carbonate-etherimide) compound has $R_1$ selected from:

wherein

R' represents hydrogen, alkyl group with 1 to 4 carbon atoms, nitro group, alkoxy group. or phenyl group; and X represents CO, SO$_2$, O, S, CH'$_2$ or NR'.

In one embodiment, poly(carbonate-etherimide) compound has R$_2$ is selected from:

wherein

R' represents hydrogen, alkyl group with 1 to 4 carbon atoms, nitro group, alkoxy group. or phenyl group; and X represents CO, SO$_2$, O, S, CH'$_2$ or NR'.

In one embodiment, poly(carbonate-etherimide) compound has R$_3$ selected from:

wherein

R' represents hydrogen, alkyl group with 1 to 4 carbon atoms, nitro group, alkoxy group. or phenyl group; and X represents CO, SO$_2$, O, S, CH'$_2$ or NR'.

In one embodiment, aromatic dianhydride in step (a) may be selected from 4,4'-(4,4'-isopropylidenediphenoxy)bis (phthalic anhydridem 1,4-bis(3,4-dicarboxyphenoxy)benzene dianhydride, 2,2-bis[4-(2,3-dicarboxyphenoxy)phenyl]-propane dianhydride, 4,4'-bis(2,3-dicarboxyphenoxy) diphenyl ether dianhydride, 1,3-bis(2,3-dicarboxyphenoxy) benzene dianhydride, 4,4'-bis(2,3-dicarboxyphenoxy) diphenyl sulfide dianhydride, 1,4-bis(2,3-dicarboxyphenoxy)benzene dianhydride, 4,4'-bis(2,3-dicarboxyphenoxy)benzophenone dianhydride, 4,4'-bis(2,3-dicarboxyphenoxy)diphenyl sulfone dianhydride, 2,2-bis[4-(3,4-dicarboxyphenoxy)phenyl]propane dianhydride, 4,4'-bis(3,4-dicarboxyphenoxy)diphenyl ether dianhydride, 4,4'-bis(3,4-dicarboxyphenoxy)diphenyl sulfide dianhydride, 1,3-bis(3,4-dicarboxyphenoxy)benzene dianhydride, 4,4'-bis(3,4-dicarboxyphenoxy)benzophenone dianhydride, 4-(2,3-dicarboxyphenoxy)-4,(3,4-dicarboxyphenoxy)diphenyl-2,2-propane dianhydride, 1,2,4,5-benzenetetracarboxylic 1,2:4,5-dianhydride, 3,3',4,4'-benzophenonetetracarboxylic acid dianhydride, 3,3',4,4'-diphenyl ether tetracarboxylic acid dianhydride, and 1,1'-biphenyl-3,3',4,4'-tetracarboxylic acid dianhydride.

Preferably, aromatic dianhydride in step (a) is aromatic bis(ether-anhydride) which is selected from 4,4'-(4,4'-isopropylidenediphenoxy)bis(phthalic anhydride), 4,4'-bis(3,4-dicarboxyphenoxy)diphenyl sulfide dianhydride, 1,3-bis(3,4-dicarboxyphenoxy)benzene dianhydride, 4,4'-bis(3,4-dicarboxyphenoxy)benzophenone dianhydride, or a mixture thereof and most preferably is 4,4'-(4,4'-isopropylidenediphenoxy)bis(phthalic anhydride).

In one embodiment, aromatic diamine in step (a) may be selected from m-phenylenediamine, p-phenylenediamine, 4,4'-diaminodiphenylpropane, 4,4'-diaminodiphenylmethane, 4,4'-diaminobiphenyl, 4,4'-diaminodiphenyl sulfide, 4,4'-diaminodiphenyl sulfone, 4,4'-diaminodiphenyl ether, 2,4-diaminotoluene, 2,6-diaminotoluene, 1,4-cyclohexanediamine, 4,4'-[methylenebis(4,1-phenyleneoxy)]bis-benzenamine, 4,4'-[(1-methylethylidene)bis(4,1-phenyleneoxy)] bis-benzenamine, 4,4'-[oxybis(4,1-phenyleneoxy)]bis-benzenamine, 4,4'-[thiobis(4,1-phenyleneoxy)]bis-benzenamine, 4,4'-[sulfonylbis(4,1-phenyleneoxy)]bis-benzenamine, bis[4-(4-aminophenoxy)phenyl]-methanone, 4,4'-(4,4'-isopropylidenediphenyl-1,1'-diyldioxy)dianiline, 4,4'-(1,1'-biphenyl-4,4'-diyldioxy)dianiline, and 4,4'-(1,3-phenylenedioxy)dianiline.

Preferably, aromatic diamine in step (a) is selected from 4,4'-diaminodiphenylpropane, 4,4'-diaminodiphenylmethane, 4,4'-diaminobiphenyl, 4,4'-diaminodiphenyl ether, 4,4'-(4,4'-isopropylidenediphenyl-1,1'-diyldioxy)dianiline, 4,4'-(1,1'-biphenyl-4,4'-diyldioxy)dianiline, 4,4'-(1,3-phenylenedioxy)dianiline, or mixture thereof, the most preferable is 4,4'-(4,4'-isopropylidenediphenyl-1,1'-diyldioxy)dianiline, 4,4'-(1,1'-biphenyl-4,4'-diyldioxy)dianiline, 4,4'-(1,3-phenylenedioxy)dianiline or a mixture thereof.

In one embodiment, the mole ratio of aromatic amine having halogen functional group to aromatic diamine in step (a) is in a range from 0.1:1 to 1:1, and the mole ratio of aromatic dianhydride to aromatic diamine in step (a) is in a range from 1:1 to 2:1.

In one embodiment, step (a) may be operated at a temperature from 100 to 240° C. for a reaction time of least 8 hours.

In one embodiment, the weight ratio of polycarbonate having molecular weight from 10,000 to 30,000 to bisphenol A in step (b) is from 1:1 to 1:3.

In one embodiment, step (b) may be operated at a temperature from 200 to 250° C. for a reaction time of from 0.5 to 2 hours.

In one embodiment, copper compound in step (c) is copper halide that may be selected from copper (I) bromide or copper (I) iodide, preferably is copper bromide.

In one embodiment, pyridyl ketone compound in step (c) may be selected from 1-pyridyl-2-propanone, 3-(2-pyridinyl)-2-butanone, 1-(2-pyridinyl)-2-butanone, 1-(6-methyl-2-pyridinyl)acetone, 1-(5-methyl-2-pyridinyl)acetone, 1-(4-methyl-2-pyridinyl)acetone, 1-(3-methyl-2-pyridinyl)acetone, 3-methyl-1-(2-pyridinyl)-2-butanone, 3-methyl-3-(pyridin-2-yl)butan-2-one, 1-(2-pyridyl)-pentan-2-one, 3,3-dimethyl-1-(2-pyridinyl)-2-butanone, and 1-(5,6,7,8-tetrahydroquinolin-8-yl)ethanone, preferably is 1-pyridyl-2-propanone.

The said pyridyl ketone compound may act as a ligand for the copper compound in step (c) which can form a coordination site via nitrogen atom and/or oxygen atom.

In one embodiment, basic cesium compound in step (c) is cesium carbonate.

In one embodiment, step (c) may be operated at a temperature from 80 to 150° C. and a reaction time of at least 48 hours.

In one embodiment, each said preparation step may further comprise the step of purification step by precipitating with organic solvent and drying, which may be selected from but not limited to evaporation by stirring, vacuum drying, heating, freeze drying, etc.

In one embodiment, this invention relates to the method for preparing poly(carbonate-etherimide) compound having graft copolymer structure as shown in the structure (II), comprising the following steps:
(a) adding aromatic amine having halogen functional group and aromatic diamine into aromatic dianhydride;
(b) mixing polycarbonate with bisphenol A; and
(c) adding a mixture containing copper compound and pyridyl ketone compound into the a mixture containing basic cesium compound and the mixture obtained from step (a) and (b);

wherein
(A) represents structure (B) represents structure $R_1$ represents aromatic with 6 to 30 carbon atoms or, optionally said aromatic is bonded with heteroatom;
$R_2$ represents aromatic with 6 to 30 carbon atoms or, optionally said aromatic is bonded with heteroatom;
$R_3$ represents aromatic with 6 to 30 carbon atoms;
m is an integer number from 1 to 15;
n is an integer number from 1 to 10;
y is an integer number from 1 to 4.

Preferably, poly(carbonate-etherimide) compound having graft copolymer structure as shown in said structure (II) may have $R_1$, $R_2$, and $R_3$ as described previously.

In one embodiment, aromatic amine having halogen functional group in step (a) may be selected from 4, 4' methylenebis(2-chloroaniline), 3,3'-dichlorobenzidine, 2, 2', 5, 5' tetrachlorobenzidine, 4,4'-(1-methylethylidene)bis[2-chloro-benzenamine], 4,4'-oxybis[2-chloro-benzenamine, bis(4-amino-3-chlorophenyl)-methanone, 4,4'-thiobis[2- chloro-benzenamine], 4,4'-sulfonylbis[2-chloro-benzenamine], 4,4'-sulfonylbis[2,6-dichloro-benzenamine], or mixture thereof, preferably is 4, 4' methylenebis(2-chloroaniline), 2, 2', 5, 5' tetrachlorobenzidine, or a mixture thereof.

In one embodiment, aromatic dianhydride and aromatic diamine in step (a) may be selected from the compound being described previously.

In one embodiment, the mole ratio of compounds and conditions of reactions in each step (a), (b), and (c) may be selected and operated as described previously.

In one embodiment, copper compound and pyridyl ketone compound in step (c) may be selected from compounds as described previously.

In another embodiment, this invention relates to poly(carbonate-etherimide) compound prepared from the method as described previously and the use of said compound as a compatibilizer for polycarbonate and polyetherimide.

The following examples are presented to is only for demonstrating one embodiment only, not the limit to the scope of this invention.

Preparation of Poly(Carbonate-Etherimide) Compound Having Block Copolymer Structure Poly(carbonate-etherimide) compound having block copolymer structure according to the invention may be prepared by the following methods.

Preparation of Polyetherimide Segment, Comprising

About 1.38 g of 4,4'-(4,4'-isopropylidenediphenyl-1,1'-diyldioxy)dianiline in about 6 mL of N-methyl-2-pyrrolidinone (NMP) was mixed with about 2.62 g of 4,4'-(4,4'-isopropylidenediphenoxy)bis(phthalic anhydride) in about 6 mL of NMP. The mixture was stirred at temperature about 10° C. for about 30 min. Then, 0.44 g of 4-chloroaniline dissolved in about 3 mL of NMP was added into said mixture and stirred for about 30 min. Then, toluene was added and refluxed at about 180° C. for at least about 8 hours. The obtained mixture was precipitated in about 200 mL of methanol. The obtained polyetherimide was dried under vacuum.

Preparation of Polycarbonate, Comprising

About 100 g of polycarbonate with molecular weight about 30,000 and about 200 g of bisphenol A was mixed in a round bottom flask. Then, the mixture was heated at about 220° C. for about 1 hour. The obtained mixture was precipitated in methanol and the obtained polycarbonate was dried under vacuum.

Preparation of Poly(Carbonate-Etherimide) Compound from Polyetherimide and Polycarbonate Obtained from the Method Described Above, Comprising About 0.11 g of polyetherimide solution in about 5 mL of dimethyl sulphoxide was mixed with about 0.59 g of polycarbonate solution in 5 mL of dimethyl sulphoxide. Then, about 0.03 g of cesium carbonate was added and the obtained mixture was stirred at temperature around 100° C. for about 10 min. Then, the mixture of about 0.31 mL of copper (I) bromide and about 0.67 μL of 1-pyridyl-2-propanone solution in about 1 mL of dimethyl sulphoxide was added and stirred for about 30 min. The reaction was carried out at temperature about 130° C. for at least about 48 hours. The obtained mixture was precipitated in about 50 mL of dichloromethane. The obtained solid was separated and dried under vacuum.

Preparation of Poly(Carbonate-Etherimide) Compound Having Graft Polymer Structure The poly(carbonate-etherimide) compound having graft polymer structure according to the invention may be prepared according to the following methods.

Preparation of Polyetherimide Segment, Comprising

About 0.41 g of 4,4'-(4,4'-isopropylidenediphenyl-1,1'-diyldioxy)dianiline in about 6 mL of N-methyl-2-pyrrolidinone (NMP) was mixed with about 0.53 g of 4,4' methylenebis(2-chloroaniline) in about 3 mL of NMP. Then, said mixture was stirred at temperature about 10° C. for about 30 min. Then, the obtained mixture was added into about 1.04 g of 4,4'-(4,4'-isopropylidenediphenoxy)bis(phthalic anhydride) in about 6 mL of NMP and stirred for about 30 min. Then, toluene was added and refluxed at about 180° C. for at least about 8 hours. The obtained mixture was precipitated in about 200 mL of methanol. The obtained polyetherimide was dried under vacuum.

Preparation of Polycarbonate, Comprising

About 100 g of polycarbonate with molecular weight about 30,000 and about 200 g of bisphenol A was mixed in a round bottom flask. Then, the mixture was heated at about 220° C. for about 1 hour. The obtained mixture was precipitated in methanol and the obtained polycarbonate was dried under vacuum.

Preparation of Poly(Carbonate-Etherimide) Compound from Polyetherimide and Polycarbonate Obtained from the Method Described Above, Comprising About 0.16 g of polyetherimide solution in about 5 mL of dimethyl sulphoxide was mixed with about 0.6 g of polycarbonate solution in 5 mL of dimethyl sulphoxide. Then, about 0.19 g of cesium carbonate was added and the obtained mixture was stirred at temperature around 100° C. for about 10 min. Then, the mixture of about 2 mL of copper (1) bromide and about 4 μL of 1-pyridyl-2-propanone solution in about 1 mL of dimethyl sulphoxide was added and stirred for about 30 min. The reaction was carried out at temperature about 130° C. for at least about 48 hours. The obtained mixture was precipitated in about 50 mL of dichloromethane. The obtained solid was separated and dried under vacuum.

Sample According to the Invention A1

The poly(carbonate-etherimide) compound having block copolymer structure was prepared according to the method described previously.

Sample According to the Invention B1

The poly(carbonate-etherimide) compound having graft copolymer structure was prepared according to the method described previously.

Comparative Sample 1a

The poly(carbonate-etherimide) compound having block copolymer structure was prepared according to the method described previously, using 4-dimethyl aminopyridine as a ligand instead of 1-pyridyl-2-propanone.

Comparative Sample 1b

The poly(carbonate-etherimide) compound having block copolymer structure was prepared according to the method described previously, using 2,2'-bipyridyl as a ligand instead of 1-pyridyl-2-propanone.

Comparative Sample 1c

The poly(carbonate-etherimide) compound having block copolymer structure was prepared according to the method described previously, using 2-picoline as a ligand instead of 1-pyridyl-2-propanone.

Comparative Sample 2a

The poly(carbonate-etherimide) compound having graft copolymer structure was prepared according to the method described previously, using 4-dimethyl aminopyridine as a ligand instead of 1-pyridyl-2-propanone.

Comparative Sample 2b

The poly(carbonate-etherimide) compound having graft copolymer structure was prepared according to the method described previously, using 2,2'-bipyridyl as a ligand instead of 1-pyridyl-2-propanone.

Comparative Sample 2c

The poly(carbonate-etherimide) compound having graft copolymer structure was prepared according to the method described previously, using 2-picoline as a ligand instead of 1-pyridyl-2-propanone.

The following are examples of property testing of poly (carbonate-etherimide) compound prepared according to the invention method, wherein the methods and equipment used in the test are commonly used and are not intended to limit the scope of the invention.

The molecular weight of poly(carbonate-etherimide) compound was measured by Shimadzu liquid chromatography (model: Prominence) by using Shimadzu Shim-Pack SPC 803 column at temperature about 40° C. Tetrahydrofuran (THF) was used as an eluent with a flow rate of 0.6 mL/min. The measured molecular weight was compared with the standard graph of polystyrene from TOSOH, type PStQuick Kit-L which covers molecular weight ranging from 266 to 427,000.

The structure of poly(carbonate-etherimide) compound was analyzed by proton-nuclear magnetic resonance spectroscopy ('H-NMR), Bruker 400 Ultra Shield, using 64 scanned cycles, about 64 Hz frequency, and operated at room temperature using deuterated chloroform ($CDCl_3$) as a solvent.

Table 1 shows molecular weight of obtained poly(carbonate-etherimide) compound.

| Sample | Molecular Weight |
|---|---|
| Comparative Sample 1a | N/A |
| Comparative Sample 1b | N/A |
| Comparative Sample 1c | N/A |
| Comparative Sample 2a | N/A |
| Comparative Sample 2b | N/A |
| Comparative Sample 2c | N/A |
| Sample A1 | 9,027 |
| Sample B1 | 9,732 |

Note:
N/A means the molecular weight of poly(carbonate-etherimide) compound since the compound cannot be obtained.

According to Table 1, it can be summarized that poly (carbonate-etherimide) compound could be prepared by using 1-pyridyl-2-propanone as a ligand in step (c).

Figure 1:
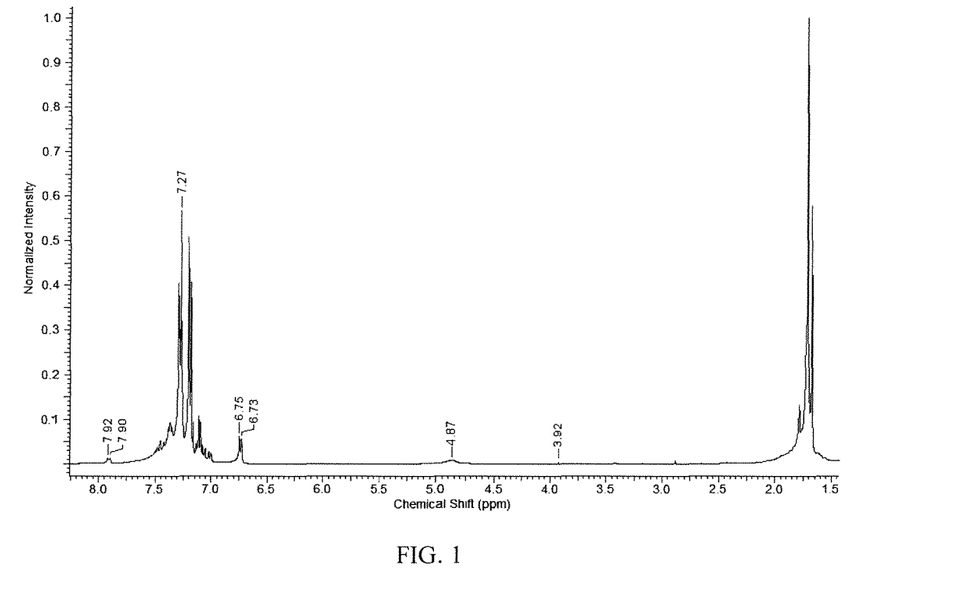
FIG. 1 shows the results from proton-nuclear magnetic resonance spectroscopy analysis of sample A1.
Figure 2:
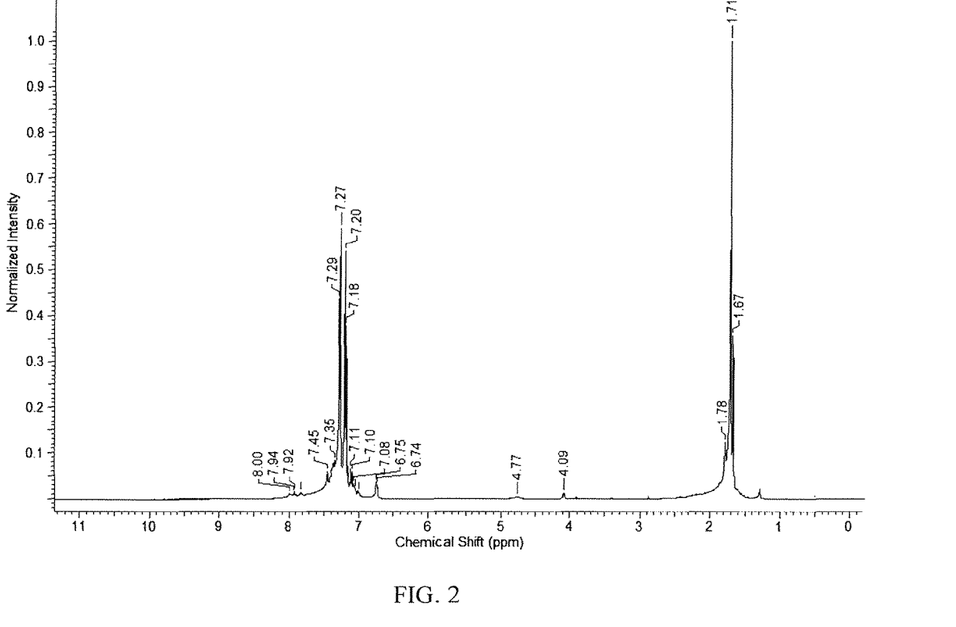
FIG. 2 shows the results from proton-nuclear magnetic resonance spectroscopy analysis of sample B1.

FIG. 1 shows the result from proton-nuclear magnetic resonance spectroscopy analysis of sample A1. From the figure, it can be concluded that structure of poly(carbonate-etherimide) compound of sample A1 is block copolymer as shown in the structure (III):

FIG. 2 shows the result from proton-nuclear magnetic resonance spectroscopy analysis of sample B1. From the figure, it can be concluded that structure of poly(carbonate-etherimide) compound of sample B1 is graft copolymer as shown in the structure (IV):

The following is the example of applying poly(carbonate-etherimide) compound as a compatibilizer, wherein polycarbonate and polyetherimide being used are intended to be examples selected to illustrate and do not limit the scope of the invention.

(IV)

The Application of Poly(Carbonate-Etherimide) Compound According to the Invention as a Compatibilizer for Polycarbonate and Polyetherimide One objective of this invention is to show that the obtained poly(carbonate-etherimide) compound according to the invention can be used as a compatibilizer for polycarbonate and polyetherimide.

Figure 3:
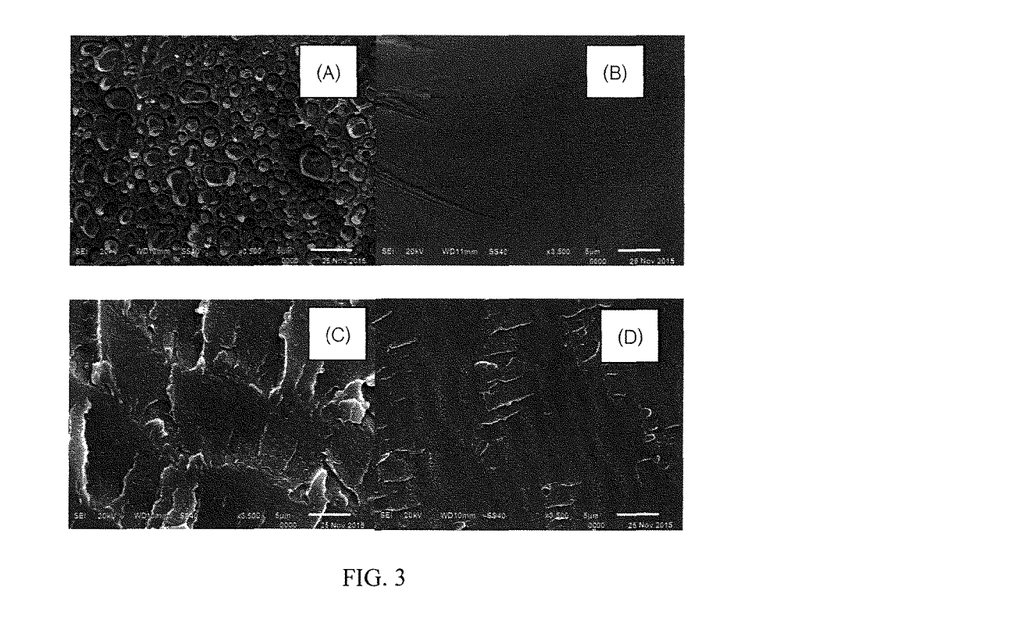
FIG. 3 shows the photographs from electron microscope at 3,500 times magnification of: a) polymer blend of polycarbonate and polyetherimide without poly(carbonate-etherimide) as compatibilizer; b) polymer blend of polycarbonate and polyetherimide comprising 0.5% by weight of sample A1; c) polymer blend of polycarbonate and polyetherimide comprising 2% by weight of sample A1; and d) polymer blend of polycarbonate and polyetherimide comprising 2% by weight of sample B1.
Figure 4:
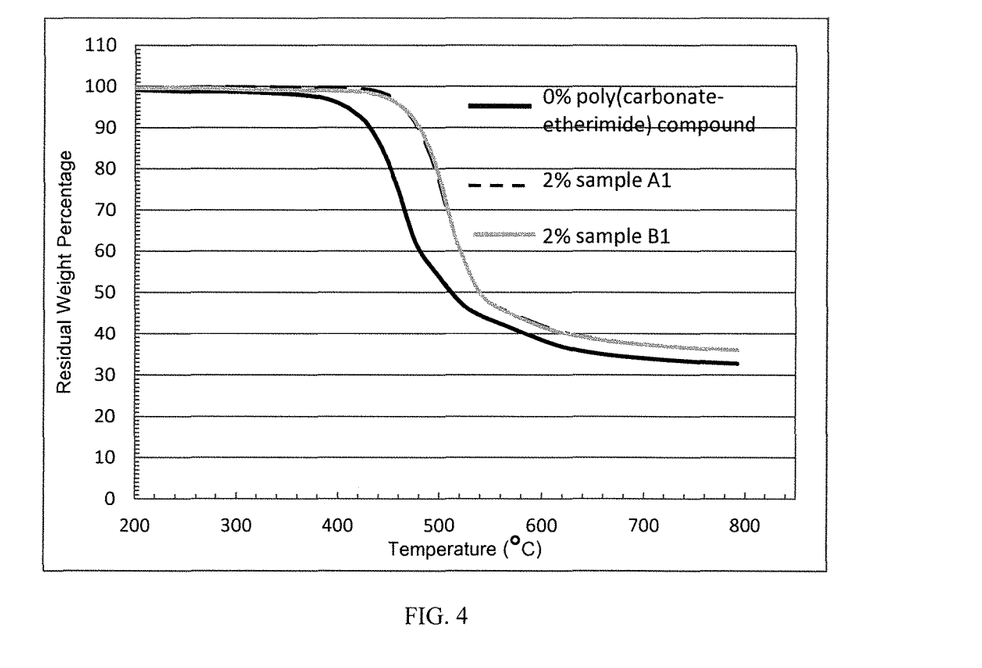
FIG. 4 shows the thermal decomposition graph by weight by thermogravimetric analysis (TGA) of polymer blends.

Prior to use, polycarbonate and polyetherimide according to the invention were dried under vacuum at temperature about 80° C. for about 8 hours. Then, polycarbonate and polyetherimide was mixed at the weight ratio of 1:1 and the obtained poly(carbonate-etherimide) compound (sample A1 or B1) was added into said mixture for the amount according to Table 2 by using an extruder. The temperature was controlled to be about 280 to 330° C. in every zone. The glass transition temperature (Tg) of obtained polymer blend was analyzed using differentiated scanning calorimeter (DSC). The results are shown in Table 2. The morphology of obtained polymer blend was analyzed using scanning electron microscope (SEM). The thermal decomposition was analyzed using thermogravimetric analysis (TGA) technique. The results are shown in FIG. 3 and FIG. 4, respectively.

Table 2 shows the glass transition temperature of polymer blends.

| Polymer blend of polycarbonate and polyetherimide | Poly(carbonate-etherimide) compound | Glass transition temperature (° C.) |
| --- | --- | --- |
| Example 1 | — | 142, 210 |
| Example 2 | Sample A1, 0.5% by weight | 137 |
| Example 3 | Sample A1, 2% by weight | 134 |
| Example 4 | Sample B1, 2% by weight | 132 |

From Table 2, it can be found that example 1 which is the polymer blend of polycarbonate and polyetherimide without poly(carbonate-etherimide) compound as a compatibilizer yields 2 glass transition temperatures. This indicates the phase separation of polycarbonate and polyetherimide. On the other hand, example 2, 3, and 4 which have poly (carbonate-etherimide) compound according to the invention as a compatibilizer yields 1 glass transition temperature, indicating the compatibility with no phase separation of said polymer blend.

Moreover, from FIG. 3 and FIG. 4, when comparing the polymer blend of polycarbonate and polyetherimide comprising poly(carbonate-etherimide) compound to the polymer blend without poly(carbonate-etherimide) compound, it can be seen that the poly(carbonate-etherimide) compound according to the invention as the compatibilizer can increase the compatibility of polycarbonate and polyetherimide, result in no phase separation and better heat resistance which can be seen from the higher thermal decomposition temperature.

BEST MODE OR PREFERRED EMBODIMENT OF THE INVENTION

Best mode or preferred embodiment of the invention is as provided in the description of the invention.

The invention claimed is:

1. A method for preparing a poly(carbonate-etherimide) compound comprising a polycarbonate segment as shown in structure (A) and a polyetherimide segment as shown in structure (B), said method comprising the steps of:
   (a) adding an aromatic amine having a halogen functional group into a solution to form a mixture, with the solution comprising an aromatic dianhydride and an aromatic diamine;
   (b) mixing a polycarbonate with bisphenol A to form a mixture; and
   (c) adding a mixture comprising a copper compound and a pyridyl ketone compound into a mixture comprising a basic cesium compound and the mixtures obtained from steps (a) and (b);

wherein $R_1$ represents a moiety having an aromatic group and 6 to 30 carbon atoms;

$R_2$ represents a moiety having an aromatic group and 6 to 30 carbon atoms;

subscript m is an integer from 1 to 15; and subscript n is an integer from 1 to 10;

provided that $R_1$ and/or $R_2$ comprises an ether group in at least one moiety indicated by subscript n.

2. The method according to claim 1, wherein the aromatic amine having a halogen functional group in step (a) is selected from the group consisting of 4-chloroaniline, 2-nitro-4-chloroaniline, 2,5-dinitro-4-chloroaniline, 2-phenyl-4-chloroaniline, 2-methoxy-4-chloroaniline, 4'-chloro-[1,1'-biphenyl]-4-amine, 4-(4-chlorophenoxy)-aniline, 4-[(4-chlorophenyl)thio]-benzenamine, and combinations thereof, and wherein the poly(carbonate-etherimide) compound has a block copolymer structure as shown in structure (I):

wherein

A represents the polycarbonate segment having structure (A);

B represents the polyetherimide segment having structure (B); and

$R_3$ represents a moiety having an aromatic group and 6 to 30 carbon atoms.

3. The method according to claim 2, wherein $R_3$ is a moiety selected from the group consisting of moieties (xiii) to (xvi):

(xv)

(xvi)

where each R' independently represents hydrogen, an alkyl group having 1 to 4 carbon atoms, a nitro group, an alkoxy group, or a phenyl group; and X represents CO, SO$_2$, O, S, CR'$_2$ or NR'.

4. The method according to claim 1, wherein the aromatic amine having a halogen functional group in step (a) is selected from the group consisting of 4,4'-methylenebis(2-chloroaniline), 3,3'-dichlorobenzidine, 2,2',5,5'-tetrachlorobenzidine, 4,4'-(1-methylethylidene)bis[2-chloro-benzenamine], 4,4'-oxybis[2-chloro-benzenamine, bis(4-amino-3-chlorophenyl)-methanone, 4,4'-thiobis[2-chloro-benzenamine], 4,4'-sulfonylbis[2-chloro-benzenamine], 4,4'-sulfonylbis[2,6-dichloro-benzenamine], and combinations thereof, and wherein the poly(carbonate-etherimide) compound has a graft copolymer structure as shown in structure (II):

$$\begin{array}{c} (O\!-\!\!(A))_y \\ | \\ (B)\!-\!R_3\!-\!(B) \end{array}$$ (II)

wherein

A represents the polycarbonate segment having structure (A);

B represents the polyetherimide segment having structure (B);

R$_3$ represents a moiety having an aromatic group and 6 to 30 carbon atoms; and y is an integer from 1 to 4.

5. The method according to claim 4, wherein R$_3$ is a moiety selected from the group consisting of moieties (xiii) to (xvi):

(xiii)

(xiv)

(xv)

(xvi)

where each R' independently represents hydrogen, an alkyl group having 1 to 4 carbon atoms, a nitro group, an alkoxy group, or a phenyl group; and

X represents CO, SO$_2$, O, S, CR'$_2$ or NR'.

6. The method according to claim 1, wherein;

R$_1$ is a moiety selected from the group consisting of moieties (i) to (vi):

(i)

(ii)

(iii)

(iv)

-continued

(v)

(vi)

where each R' independently represents hydrogen, an alkyl group having 1 to 4 carbon atoms, a nitro group, an alkoxy group, or a phenyl group; and

X represents CO, $SO_2$, O, S, $CR'_2$ or NR'; and

$R_2$ is a moiety selected from the group consisting of moieties (vii) to (xii):

(vii)

(viii)

(ix)

(x)

(xi)

-continued (xii)

where each R' independently represents hydrogen, an alkyl group having 1 to 4 carbon atoms, a nitro group, an alkoxy group, or a phenyl group; and X represents CO, $SO_2$, O, S, $CR'_2$ or NR'.

7. The method according to claim 1, wherein the aromatic dianhydride in step (a) is an aromatic bis(ether-anhydride) selected from the group consisting of 4,4'-(4,4'-isopropylidenediphenoxy)bis(phthalic anhydride), 4,4'-bis(3,4-dicarboxyphenoxy)diphenyl sulfide dianhydride, 1,3-bis(3,4-dicarboxyphenoxy)benzene dianhydride, 4,4'-bis(3,4-dicarboxyphenoxy)benzophenone dianhydride, and combinations thereof.

8. The method according to claim 1, wherein the aromatic diamine in step (a) is selected from the group consisting of 4,4'-diaminodiphenylpropane, 4,4'-diaminodiphenylmethane, 4,4'-diaminobiphenyl, 4,4'-diaminodiphenyl ether, 4,4'-(4,4'-isopropylidenediphenyl-1,1'-diyldioxy)dianiline, 4,4'-(1,1'-biphenyl-4,4'-diyldioxy)dianiline, 4,4'-(1,3-phenylenedioxy)dianiline, and combinations thereof.

9. The method according to claim 1, wherein:
the mixture of step (a) is heated at a temperature of from 100 to 240° C. for a reaction time of at least 8 hours;
the mole ratio of the aromatic amine having a halogen functional group to the aromatic diamine in step (a) is from 0.1:1 to 1:1; and
the mole ratio of the aromatic dianhydride to the aromatic diamine in step (a) is from 1:1 to 2:1.

10. The method according to claim 1, wherein:
the mixture in step (b) is heated at a temperature of from 200 to 250° C. for a reaction time of from 0.5 to 2 hours;
the polycarbonate in step (b) has a molecular weight of from 10,000 to 30,000; and
the weight ratio of the polycarbonate to the bisphenol A in step (b) is from 1:1 to 1:3.

11. The method according to claim 1, wherein the copper compound in step (c) is a copper halide, optionally wherein the copper compound is copper (I) bromide or copper (I) iodide.

12. The method according to claim 1, wherein the pyridyl ketone compound in step (c) is selected from the group consisting of 1-pyridyl-2-propanone, 3-(2-pyridinyl)-2-butanone, 1-(2-pyridinyl)-2-butanone, 1-(6-methyl-2-pyridinyl) acetone, 1-(5-methyl-2-pyridinyl) acetone, 1-(4-methyl-2-pyridinyl)acetone, 1-(3-methyl-2-pyridinyl) acetone, 3-methyl-1-(2-pyridinyl)-2-butanone, 3-methyl-3-(pyridin-2-yl)butan-2-one, 1-(2-pyridyl)-pentan-2-one, 3,3-dimethyl-1-(2-pyridinyl)-2-butanone, and 1 (5,6,7,8-tetrahydroquinolin-8-yl)ethanone, and combinations thereof.

13. The method according to claim 1, wherein:
the resulting mixture in step (c) is heated at a temperature of from 80 to 150° C. for a reaction time of at least 48 hours; and
the basic cesium compound in step (c) is cesium carbonate.

14. A method for preparing a poly(carbonate-etherimide) compound having a graft copolymer structure as shown in structure (II), said method comprising the steps of:
(a) adding an aromatic amine having a halogen functional group and an aromatic diamine into an aromatic dianhydride to form a mixture;
(b) mixing a polycarbonate and bisphenol A to form a mixture; and
(c) adding a mixture comprising a copper compound and a pyridyl ketone compound into a mixture comprising a basic cesium compound and the mixtures obtained from steps (a) and (b);

$$(B)-R_3-(B) \quad | \quad (O-(A))_y ; \quad (II)$$

wherein
A represents a polycarbonate segment having structure (A):

$$\left[ O-C(O)-O-C_6H_4-C(CH_3)_2-C_6H_4 \right]_m ; \quad (A)$$

B represents a polyetherimide segment having structure (B):

$$\left[ N(CO)_2 R_1 (CO)_2 N - R_2 \right]_n ; \quad (B)$$

$R_1$ represents a moiety having an aromatic group and 6 to 30 carbon atoms;
$R_2$ represents a moiety having an aromatic group and 6 to 30 carbon atoms;
$R_3$ represents a moiety having an aromatic group and 6 to 30 carbon atoms;
subscript m is an integer from 1 to 15;
subscript n is an integer from 1 to 10; and
subscript y is an integer from 1 to 4;
provided that $R_1$ and/or $R_2$ comprises an ether group in at least one moiety indicated by subscript n.

15. The method according to claim 14, wherein:
$R_1$ is a moiety selected from the group consisting of moieties (i) to (vi):

(i)

(ii)

(iii)

(iv)

(v)

(vii)

where each R' independently represents hydrogen, an alkyl group having 1 to 4 carbon atoms, a nitro group, an alkoxy group, or a phenyl group; and
X represents CO, $SO_2$, O, S, $CR'_2$ or NR';
$R_2$ is a moiety selected from the group consisting of moieties (vii) to (xii):

(vii)

(viii)

where each R' independently represents hydrogen, an alkyl group having 1 to 4 carbon atoms, a nitro group, an alkoxy group, or a phenyl group; and X represents CO, SO$_2$, O, S, CR'$_2$ or NR'.

16. The method according to claim 14, wherein the aromatic dianhydride in step (a) is an aromatic bis(ether-anhydride) selected from the group consisting of 4,4'-(4,4'-isopropylidenediphenoxy) bis(phthalic anhydride, 4,4'-bis (3,4-dicarboxyphenoxy)diphenyl sulfide dianhydride, 1,3-bis(3,4-dicarboxyphenoxy)benzene dianhydride, 4,4'-bis(3, 4-dicarboxyphenoxy)benzophenone dianhydride, and combinations thereof.

17. The method according to claim 14, wherein the aromatic diamine in step (a) is selected from the group consisting of 4,4'-diaminodiphenylpropane, 4,4'-diaminodiphenylmethane, 4,4'-diaminobiphenyl, 4,4'-diaminodiphenyl ether, 4,4'-(4,4'-isopropylidenediphenyl-1,1'-diyldioxy) dianiline, 4,4'-(1,1'-biphenyl-4,4'-diyldioxy)dianiline, 4,4'-(1,3-phenylenedioxy)dianiline, and combinations thereof.

18. The method according to claim 14, wherein:
the mixture of step (a) is heated at a temperature of from 100 to 240° C. for a reaction time of at least 8 hours;
the mole ratio of the aromatic amine having a halogen functional group to the aromatic diamine in step (a) is from 0.1:1 to 1:1; and
the mole ratio of the aromatic dianhydride to the aromatic diamine in step (a) is from 1:1 to 2:1.

19. The method according to claim 14, wherein:
the mixture of step (b) is heated at a temperature of from 200 to 250° C. for a reaction time of from 0.5 to 2 hours;
the polycarbonate in step (b) has a molecular weight of from 10,000 to 30,000; and
the weight ratio of the polycarbonate to the bisphenol A in step (b) is from 1:1 to 1:3.

20. The method according to claim 14, wherein the copper compound in step (c) is a copper halide, optionally wherein the copper compound is copper (I) bromide or copper (I) iodide.

21. The method according to claim 14, wherein the pyridyl ketone compound in step (c) is selected from the group consisting of 1-pyridyl-2-propanone, 3-(2-pyridinyl)-2-butanone, 1-(2-pyridinyl)-2-butanone, 1-(6-methyl-2-pyridinyl) acetone, 1-(5-methyl-2-pyridinyl) acetone, 1-(4-methyl-2-pyridinyl)acetone, 1-(3-methyl-2-pyridinyl) acetone, 3-methyl-1-(2-pyridinyl)-2-butanone, 3-methyl-3-(pyridin-2-yl)butan-2-one, 1-(2-pyridyl)-pentan-2-one, 3,3-dimethyl-1-(2-pyridinyl)-2-butanone, 1 (5,6,7,8-tetrahydroquinolin-8-yl)ethanone, and combinations thereof.

22. The method according to claim 14, wherein:
the mixture of step (c) is heated at a temperature of from 80 to 150° C. for a reaction time of at least 48 hours; and
the basic cesium compound in step (c) is cesium carbonate.

where each R' independently represents hydrogen, an alkyl group having 1 to 4 carbon atoms, a nitro group, an alkoxy group, or a phenyl group; and X represents CO, SO$_2$, O, S, CR'$_2$ or NR'; and R$_3$ is a moiety selected from the group consisting of moieties (xiii) to (xvi):

* * * * *